(12) United States Patent
Bambauer et al.

(10) Patent No.: US 6,173,678 B1
(45) Date of Patent: Jan. 16, 2001

(54) AMUSEMENT DEVICE FOR AN ANIMAL

(75) Inventors: Sheila Bambauer, Elgin; JoAnn Reisen, Tucson, both of AZ (US)

(73) Assignee: Reibam, Inc., Tucson, AZ (US)

( * ) Notice: Under 35 U.S.C. 154(b), the term of this patent shall be extended for 0 days.

(21) Appl. No.: 09/425,086

(22) Filed: Oct. 22, 1999

Related U.S. Application Data

(60) Provisional application No. 60/105,846, filed on Oct. 26, 1998.

(51) Int. Cl.$^7$ .......................... A01K 29/00; A63B 69/04; A63H 13/18; A63G 13/06
(52) U.S. Cl. ............................ 119/707; 482/85; 446/325; 472/102
(58) Field of Search ..................................... 119/702, 707, 119/709; 446/226, 227, 273, 319, 325, 396; 482/85; 472/102

(56) References Cited

U.S. PATENT DOCUMENTS

| | | | |
|---|---|---|---|
| 952,862 | * | 3/1910 | Armstrong ............................. 482/85 |
| 1,630,137 | * | 5/1927 | Ruwwe ................................. 446/325 |
| 1,846,393 | * | 2/1932 | Hankins ................................ 472/102 |
| 2,404,729 | * | 7/1946 | Hurt ........................................ 9/17 |
| 2,632,977 | * | 3/1953 | Valasek ................................. 46/149 |
| 3,564,759 | * | 2/1971 | Buttermore ............................. 46/32 |
| 4,770,408 | * | 9/1988 | Wolfe ................................... 272/52 |
| 4,770,412 | * | 9/1988 | Wolfe ................................... 272/77 |
| 4,802,444 | * | 2/1989 | Markham et al. ..................... 119/29 |
| 5,207,420 | * | 5/1993 | Crawford et al. ................. 273/58 K |
| 5,351,652 | * | 10/1994 | Budman et al. ..................... 119/711 |
| 5,377,625 | * | 1/1995 | Budman et al. ..................... 119/709 |
| 5,535,703 | * | 7/1996 | Kerzner ................................ 119/707 |
| 5,560,319 | * | 10/1996 | Rising .................................. 119/709 |
| 5,706,762 | * | 1/1998 | Dokken ................................ 119/712 |
| 5,810,641 | * | 9/1998 | Lo ........................................ 446/325 |
| 5,961,426 | * | 10/1999 | Spector ................................. 482/83 |
| 5,965,182 | * | 10/1999 | Lindgren .............................. 426/104 |

* cited by examiner

Primary Examiner—Michael J. Carone
Assistant Examiner—Son T. Nguyen
(74) Attorney, Agent, or Firm—Snell & Wilmer L.L.P.

(57) ABSTRACT

A new and useful amusement device for an animal such as a horse is provided, which is designed to (i) occupy and amuse an animal such as a horse which is confined to an enclosure, (ii) condition the animal against an event such as a foreign object appearing in the enclosure, and (iii) enable the animal to exercise by playing in various ways with the device. The amusement device is designed to be rugged and durable enough to withstand environmental conditions of an animal enclosure such as a paddock or corral, and flexible enough to retain is shape despite the physical abuse associated with being played with by a horse. According to the preferred embodiment, the amusement device comprises an article having a horse play value comprising a shape and size which encourages a horse to play with the article by (i) biting or chewing the article, (ii) gripping the article in its mouth and tossing the article and/or (iii) stepping on the article, and a flexibility and durability such that the article will retain its horse play value for a predetermined period of time in an outdoor environment such as a horse corral and being repeatedly bitten, chewed, tossed and/or stepped on by a horse over that predetermined period of time. Moreover, according to the preferred embodiment, the article has a configuration such as a simulated mane and/or simulated forelock configured to provide a convenient biting, chewing and/or gripping shape for a horse. Additionally, selected portions of the amusement device preferably have a textured outer surface which is configured to receive and retain paint, so that the selected portions can be painted a selected color. This provides the owner of the animal an opportunity to customize the article.

9 Claims, 3 Drawing Sheets

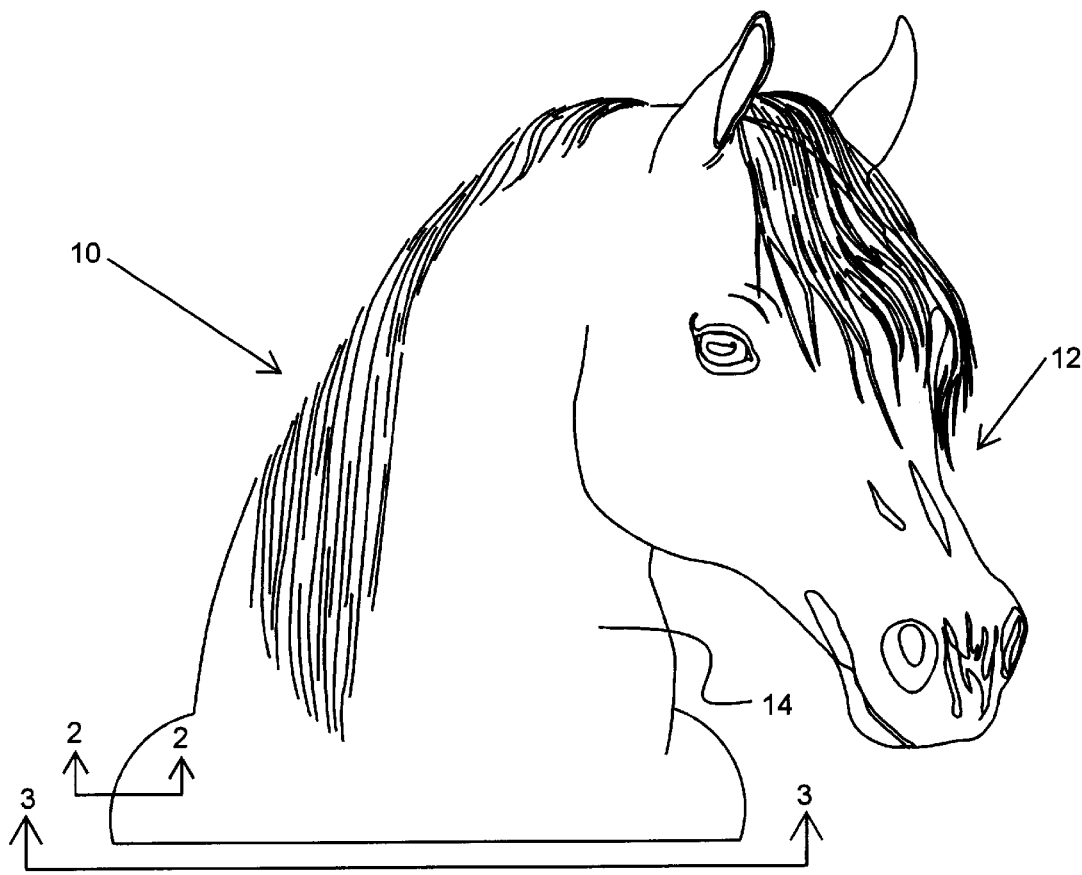
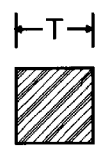
FIG. 1
FIG. 2
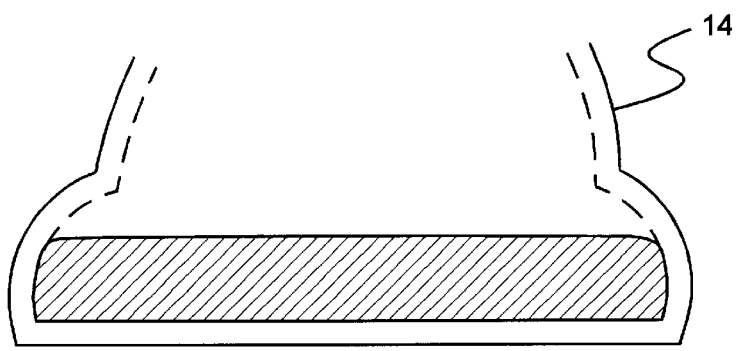
FIG. 3

AMUSEMENT DEVICE FOR AN ANIMAL

RELATED APPLICATION/CLAIM OF PRIORITY

This Application is related to and claims priority from Provisional Application Ser. No. 60/105,846, entitled "Toys For Horses", filed Oct. 26, 1998.

FIELD OF THE INVENTION

The present invention relates to an amusement device, and particularly to an amusement device for an animal such as a horse.

BACKGROUND OF THE INVENTION

Horses, particularly domestic horses, typically spend considerable time in a solitary environment such as a paddock or corral.

In the applicants' experience, a horse is generally a social animal, and time spent in a solitary environment such as a paddock or corral can have a significant effect on the horse's psyche. Thus, applicants believe there is a significant need for devices that can at least partially relieve the effects of such a solitary environment. Specifically, applicants believe there is a need for devices that can (i) occupy and amuse a horse, (ii) condition the horse against startling events (e.g. a foreign object appearing in the paddock or corral), (iii) enable the horse to exercise by providing an object the horse can nuzzle, push, step on, bite and/or chew, and (iv) otherwise enable the horse to amuse itself.

Moreover, applicants believe that an amusement device for a horse should be rugged and durable enough to withstand the environmental conditions of a paddock or corral, as well as flexible enough to substantially retain its shape despite the physical abuse of being played with by a horse over a period of time.

SUMMARY OF THE INVENTION

The present invention provides a new and useful amusement device for an animal such as a horse, which is designed to (i) occupy and amuse an animal such as a horse which is confined to an enclosure (e.g. a paddock or corral), and (ii) enable the animal to exercise by playing with the device in various ways. Moreover, an amusement device according to the invention is designed to be rugged and durable enough to withstand environmental conditions of an animal enclosure such as a paddock or corral, and flexible enough to retain its shape despite the physical abuse associated with being played with by an animal such as a horse over a period of time.

According to a preferred embodiment, a device is provided for amusing and occupying a horse, and comprises an article having a. a horse play value comprising a shape and size which encourages a horse to play with the article by (i) biting or chewing the article, (ii) gripping the article in its mouth and tossing the article and/or (iii) stepping on the article, and b. a flexibility and durability such that the article will retain its horse play value for a predetermined period of time in an outdoor environment such as a horse corral and being repeatedly bitten, chewed, tossed and/or stepped on by a horse over that predetermined period of time.

Moreover, according to the preferred embodiment, the article is shaped to simulate a horse head. Additionally, the article is hollow, and has a configuration such as a simulated snout, mane and/or forelock which provides a convenient biting, chewing and/or gripping shape for a horse.

According to an additional feature of the preferred embodiment, the outer surface of the amusement device is textured, and selected portions of the amusement device (e.g., the simulated mane and simulated forelock) have configurations designed to receive and retain paint, so that the outer surface of the device and the selected portions can be painted a selected color or with a customized design. This provides the owner of the device an opportunity to customize the article, to look like the owner's horse and/or to otherwise suit the owner's artistic preferences.

Still further, according to the preferred embodiment, the article is formed of a low density polyethylene material or a vinyl material. Low density polyethylene is preferred for an amusement device for an animal such as a horse. Low density polyethylene is generally more rugged and durable than vinyl, but vinyl is believed to be more flexible than low density polyethylene, so the material of choice for a particular animal species would depend on which characteristic is more important for the particular species. Also, it is preferred that the article is configured with UV protection designed to prevent significant UV degradation of the toy article over a predetermined period of time (e.g. three months or more).

In the following detailed description, several versions of an amusement device for a horse are shown. In one version, the simulated horse head is designed to be placed on the ground in an enclosure such as a paddock or corral, so that a horse can pick up the article and play with it in various ways. In another version the simulated horse head is configured to be coupled to the upper portion of an upstanding base member, and the base member is weighted so as to function as a rocker. When the simulated horse head is coupled to the base member the simulated horse head and base member combine to form an amusement device which is biased toward an upright position in which the simulated horse head is at its upper end. In that upright position, the simulated horse head is about the height of the head of a horse. The weighted base portion enables the amusement device to rock when the device is pushed or nuzzled by a horse. However, when the horse leaves the device alone, the weighted base will bias the device toward its upright position.

Additionally, since the simulated horse head and base member are separate members, a different article (e.g., a different simulated horse head, or even a simulated animal head other than a horse head) can be coupled to the base member, to change the look of the amusement device.

In this application, the "flexibility" of an amusement device for an animal such as a horse is the ability of the article substantially to retain its original shape after being deformed due to being bitten, tossed and/or stepped on by a horse. The "durability" of the article is the ability of the article to withstand environment conditions of a horse corral and to retain its flexibility for a significant period of time under normal horse play conditions (a significant period of time meaning repeated play by a horse daily for at least a month).

Further features of the present invention will become apparent from the following detailed description and the accompanying drawings.

BRIEF DESCRIPTION OF THE DRAWINGS

FIG. 1 is a schematic illustration of one configuration for an amusement device according to the present invention, lying on the ground of a horse paddock or corral;

FIG. 2 is a cross sectional view of the amusement device of FIG. 1, taken from the direction 2—2;

FIG. 3 is a fragmentary, schematic illustration of the amusement device of FIG. 1 taken from the direction 3—3;

DETAILED DESCRIPTION

Figure 4:
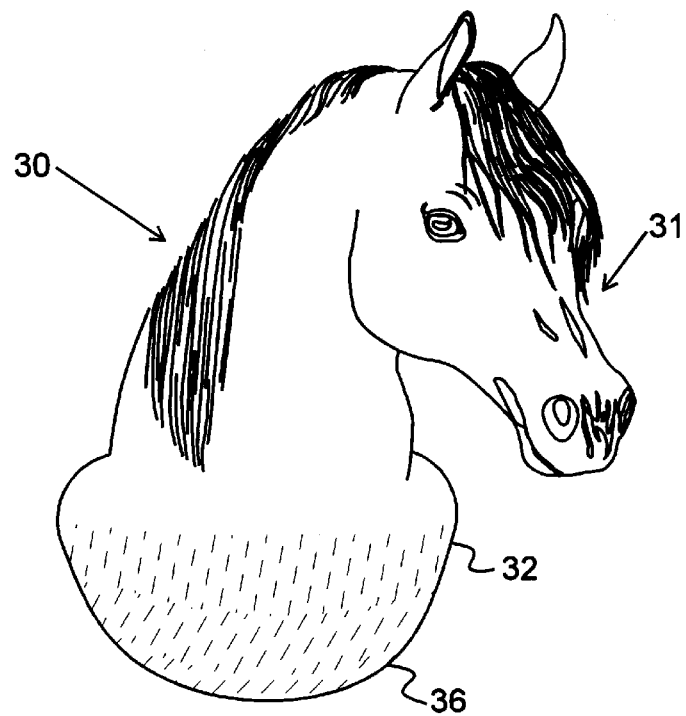
FIG. 4 is a schematic illustration of another configuration for an amusement device according to the present invention.

As described above, the present invention relates to an amusement device for an animal such as a horse. The present invention is described below in connection with an amusement device specially designed for a horse, but it will be clear to those in the art that the principles of the present invention can be used to form an amusement device for other animal species.

A horse, particularly a domestic horse, typically spends a considerable time in a solitary environment such as a paddock or corral. In the applicants' experience, a horse is generally a social animal, and time spent in a solitary environment such as a paddock or corral can have a significant effect on the horse's psyche. Thus, an amusement device according to the present invention is designed to amuse and occupy a horse when the horse is in such a solitary environment. Specifically, an amusement device according to the present invention is designed to (i) occupy and amuse a horse, (ii) condition the horse against startling events (e.g. a foreign object appearing in the paddock or corral), (iii) enable the horse to exercise by providing an object the horse can nuzzle, push, step on, bite and/or chew, and (iv) otherwise enable the horse to amuse and/or occupy itself to prevent boredom habits (e.g., cribbing, pawing and pacing).

Moreover, an amusement device according to the present invention is designed to be rugged and durable enough to withstand environmental conditions of a paddock or corral, as well as flexible enough to retain its shape despite the physical abuse of being played with by a horse over a period of time.

As illustrated in FIG. 1, an amusement device 10 is specially designed for a horse, and is configured in the shape of a horse head 12. The device is hollow (FIG. 3), and has a thickness T (FIG. 2) of about ⅛ inch. The device is formed of low density polyethylene, because that material is durable and flexible enough to withstand the type of play to which it would normally be subjected by a horse. Specifically, the amusement device is intended to be nuzzled, tossed, bitten, chewed and stepped on by a horse, and should be capable of withstanding that type of play for a significant period of time (e.g. at least three months). Low density polyethylene, e.g. of a type which can be used to blow mold an article in a thickness of about ⅛ inch should provide that type of play. However, if more flexibility is needed for the article, vinyl can also be used. The low density polyethylene can be blow molded to form the device of the present invention by a company named Mainland Products, Inc., Ontario, Calif.

The simulated horse head 12 can be formed by any technique which is conventionally used to form low density polyethylene into a designed form. For example, the simulated horse head can be blow molded against a mold form, to form the simulated horse head. Attachment A shows a form for a horse head, and that form can be used to form a mold form of the horse head. The mold form can be used in blow molding low density polyethylene into a simulated horse head. As seen from FIG. 1 and Attachment A, the bottom portion of the horse head is widened slightly, to enable the horse head to support itself in an upright orientation, when the horse head is resting on the ground of a paddock or corral.

The horse head 12 illustrated in FIGS. 1, 2 is hollow (see FIG. 3) and the outer surface 14 as well as selected portions (e.g., a simulated mane and a simulated forelock) are textured or configured to retain paint. The hollow configuration makes the device convenient for a horse to grip, bite and/or chew, and light enough for a horse to toss about a paddock or corral. The textured outer surface and the configurations of the selected portions enable the article conveniently to retain paint. This feature allows the owner of the device (e.g., a horse owner or attendant) to paint the article and the selected portions of the horse head to customize the horse head to the owner's preference, or for any other purpose. Attachments B–D show the manner in which a simulated horse head can be customized. For example, a simulated horse head can be initially produced with the "standard" shape and coloration of Attachment B. The simulated horse head can then be customized by the owner, to depict a "Chestnut Sorrel" horse head (Attachment C) OR A "Bay" horse head (Attachment D) by customizing the outer surface and/or the simulated mane and/or the simulated forelock.

Moreover, the horse head 12 is coated with a UV resistant coating, thereby enabling the horse head to resist degradation due to UV radiation for a significant period of time (preferably at least three months) even while the horse head is in an outside environment such as a corral.

Additionally, the horse head of FIG. 1, 2, and Attachments B–D is configured with portions which are designed to encourage a horse to grab the horse head in its mouth. Specifically, the horse head 12 is configured with a simulated snout, a simulated mane and a simulated forelock (Attachments B–D), each of which has a size and shape designed to provide a convenient gripping area for a horse, thereby encouraging a horse to grab the horse head, bite it, chew on it, toss it, or do those things that will enable a horse to play with the article. Also, since the horse head 12 is hollow and flexible, if a horse steps on the article, the article will return to is original shape, thereby providing more play value to a horse.

Still further, the article being shaped like a horse head is believed to encourage a horse to play with the article, because the horse will find it to be a shape the horse is familiar with. However, the article could have other shapes, some of which are less familiar to a horse while others are more familiar to a horse, but all of which can have a similar purpose of encouraging a horse to play with the article and to make a horse comfortable with articles of different shapes in its corral. For example, the article could be shaped like a flexible stick or a rock, two objects which a horse could find in a corral and find amusing to play with. Alternatively, the article could be shaped like an object which if found in a corral could startle a horse. The purpose of such an amusement device would be to enable a horse to become familiar with such types of articles in a corral, and be less likely to be startled when such an object appears in the corral.

FIG. 4 show modified versions of an amusement device according to the present invention. FIG. 4 shows an amusement device 30 has the shape of an upstanding cone shaped article, with a simulated horse head 31 at its upper end, with an enlarged, rounded base 32. The device 30, will stand upright, and the base 32 is weighted such that the device 30 can be pushed over by a horse, and will then be biased by the weighted base to an upright orientation. Preferably, the device 30 is formed of two parts; the simulated horse head 31, which is generally similar to the horse head of FIG. 1, and the base 32. The base 32 has a bottom 36 which is weighted or otherwise configured to bias the base 32 to an upright position. The upper portion of the base 32 is configured to mate with the neck of the simulated horse head 31, to form a complete, upstanding, cone shaped device with the simulated horse head 31 at the top and the base 32 portion at the bottom. For example, the simulated horse head 31 can be molded with integral coupling devices, such as one or more tabs, and the base 32 can be formed with mating coupling devices, such as one or more recesses, to allow the simulated horse head to be coupled to the base 32. The base portion 32 can rock on its bottom surface 36, to enable the device 30 to rock when the device is nuzzled or pushed by a horse. The base 32, and thus device 30, are biased to return to an upright position when a horse stops nuzzling or pushing the device 30.

Figure 7:
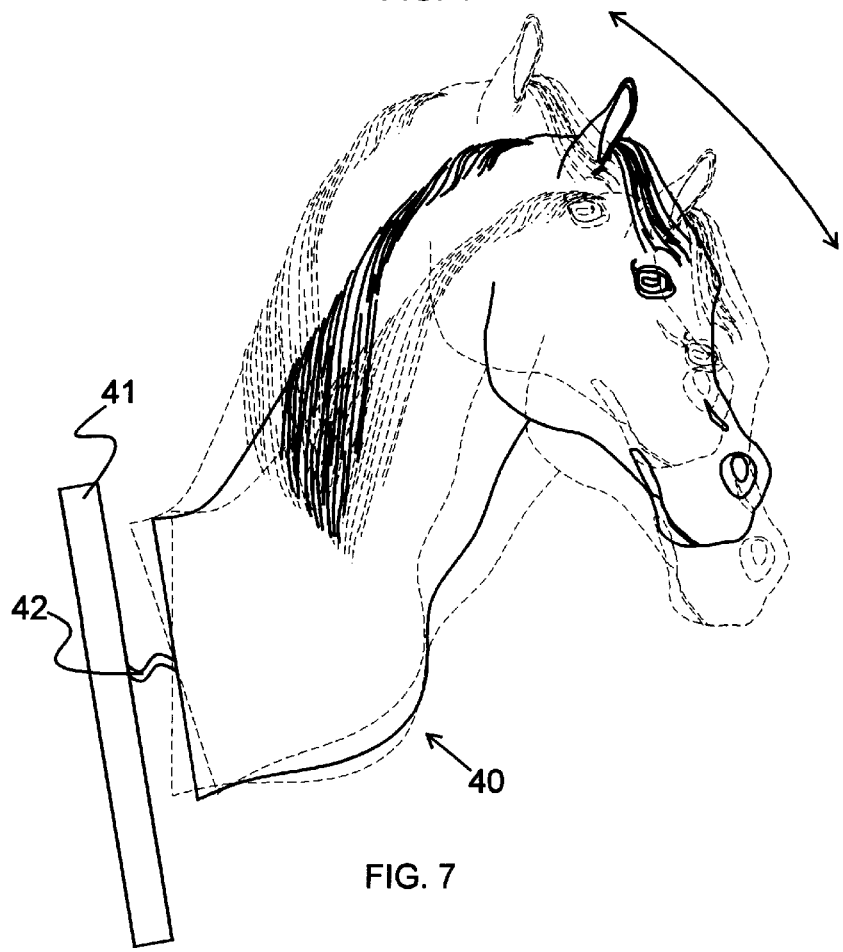
FIGS. 5–7 are schematic illustrations of still other configurations for an amusement device according to the present invention.
Figure 5:
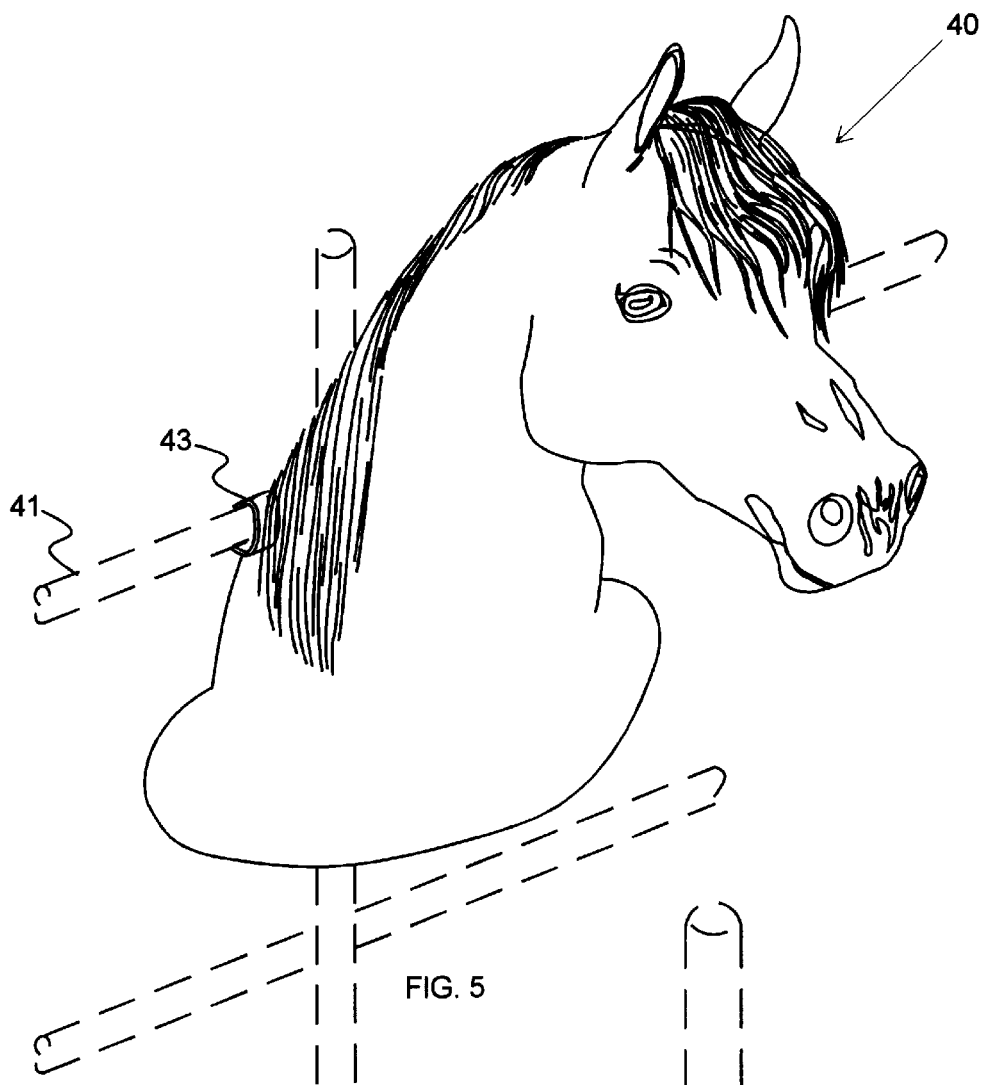
Figure 6:
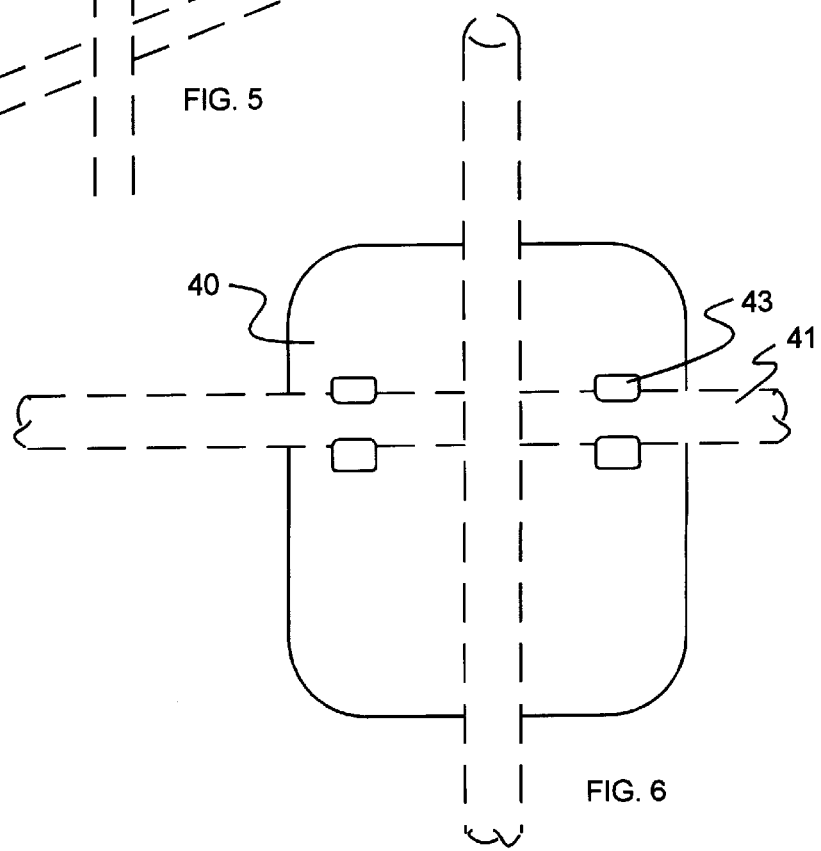

FIGS. 5–7 show embodiments in which a simulated horse head 40 is clamped to the top of 41 a fence of a corral. In that position, the simulated horse head should be at about the height of a horse's head, to provide a horse with an amusement device at a convenient height for the horse to play with. In one embodiment (FIG. 7) there is a spring 42 between the fence clamp 43 and the simulated horse head 40, which enables the horse head 40 to vibrate, bob or swing when the horse head is being played with by a horse, and which biases the simulated horse head 40 to a predetermined position when the horse stops playing with the simulated horse head 40.

Thus, according to the foregoing description, applicants have provided an amusement device which is believed capable of amusing a horse in a confined area such as a paddock or a corral. However, the principles of the present invention are believed capable of constructing articles for other types of domestic animals.

What is claimed is:

1. A method of amusing or occupying a horse comprising the steps of
    A. providing an article having
        a. a horse play value comprising a shape and size which encourages a horse to play with the article by (i) biting or chewing the article, (ii) gripping the article in its mouth and tossing the article and/or stepping on the article, and
        b. a flexibility and durability that enables the article to retain its horse play value for a predetermined period of time in an outdoor environment and being repeatedly bitten, chewed, tossed and/or stepped on by a horse over that predetermined period of time, and
    said article being hollow and having a shape that simulates a horse head; and
    B. placing said article in a horse enclosure.

2. A method as defined in claim 1, wherein said shape includes a simulated mane configured to provide a convenient biting, chewing and/or gripping shape for a horse.

3. A method as defined in claim 1, wherein said shape includes a simulated forelock configured to provide a convenient biting, chewing and/or gripping shape for a horse.

4. A method as defined in claim 3, wherein said shape further includes a simulated mane configured to provide a convenient biting, chewing and/or gripping shape for a horse.

5. A method as defined in claim 4, wherein said toy article has selected portions with a textured outer surface, said textured outer surface being configured to enable said selected portions receive and retain paint, so that said selected portions can be selectively painted.

6. A method as defined in claim 1, wherein said article is configured with UV protection designed to prevent significant UV degradation of the toy article over said predetermined period of time.

7. A method as defined in claim 1 wherein said article is hollow, formed of low density polyethylene, and has a widened bottom configured to enable the article to be supported on a surface of the horse enclosure in an upright orientation.

8. A method as defined in claim 1, further including the steps of providing and placing in said horse enclosure a weighted base with said article coupled to said weighted base, said weighted base having a coupling device, and said widened bottom of said article having a coupling device configured to mate with the coupling device of said weighted base, so that said article can be coupled to said weighted base; and said weighted base being configured to bias said article to an upright orientation and to return said article to the upright orientation after said article has been nuzzled or pushed by a horse.

9. A method as defined in any of claims 2,3,4,5,6, or 8, wherein said article is formed of low density polyethylene.

* * * * *